Aug. 26, 1958 F. T. THOMPSON 2,849,648

TELEVISION APPARATUS

Filed June 22, 1956

INVENTOR
Francis T. Thompson.
BY
John J. Callahan
ATTORNEY 2,849,648

TELEVISION APPARATUS

Francis T. Thompson, Pittsburgh, Pa., assignor to Westinghouse Electric Corporation, East Pittsburgh, Pa., a corporation of Pennsylvania Application June 22, 1956, Serial No. 593,201

7 Claims. (Cl. 315—24)

Figures 1, 2:
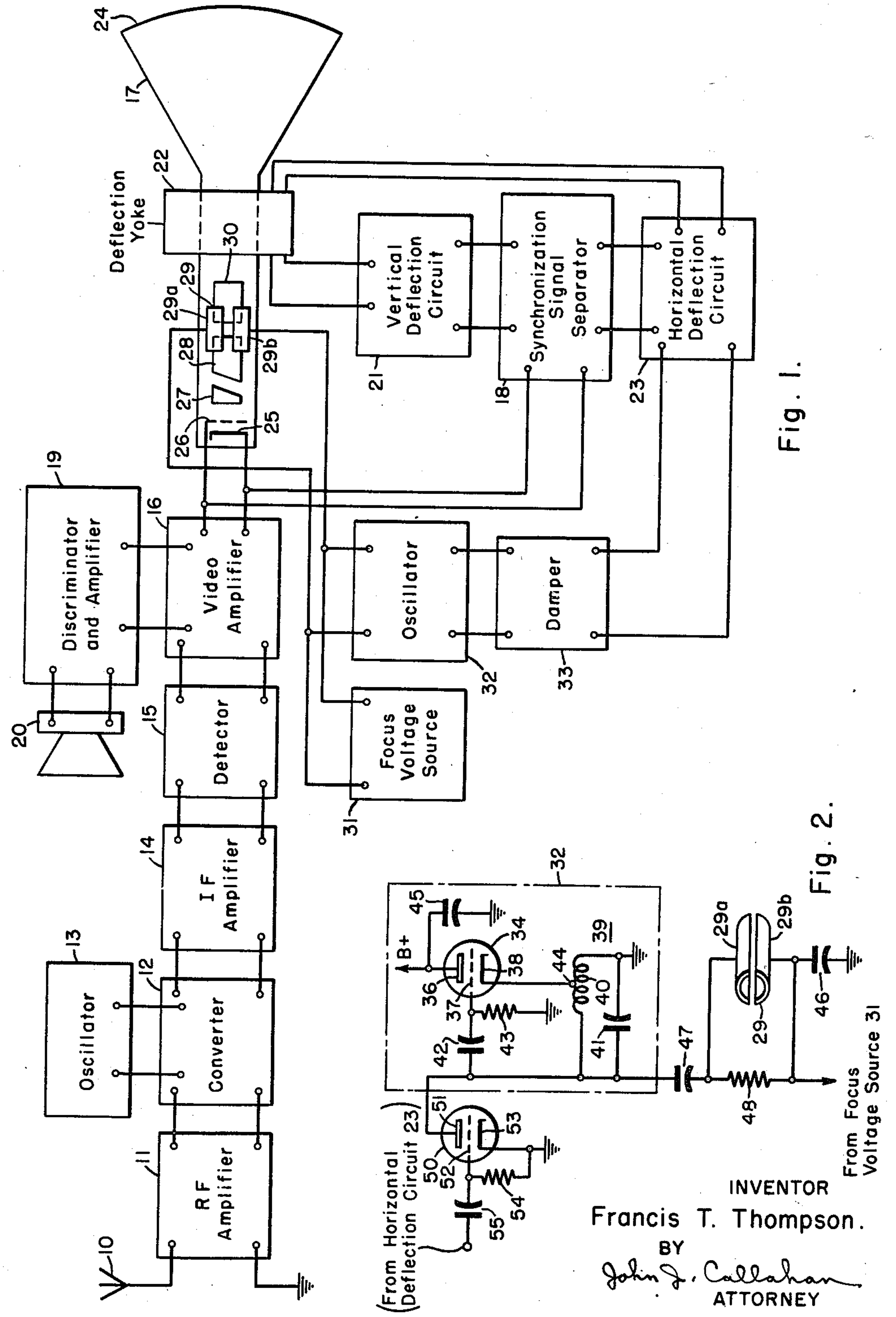

This invention relates to television receivers and the like and, more particularly, to a spot wobble deflection system for use with cathode ray tubes. The invention has particular application to television picture tubes for the reduction and elimination of the appearance of the individual horizontal lines which make up the image reproduced on the screen of the picture tube.

The trend toward the use of larger television picture tubes has declined because of the practical limitations on viewing distance. The average room in a home in which a television receiver is located is too small to allow comfortable viewing of a large screen television receiver. A minimum viewing distance is imposed by the line structure of the picture that is reproduced. The scanning lines become noticeable when the receiver is viewed more closely and the illusion of a continuous picture is lost. It is especially desirable to eliminate the line structure in large screen television receivers to allow these receivers to be comfortably viewed from a closer distance.

It has been found that the line structure may be reduced or eliminated by adding a high frequency vertical undulation to a conventional scan, that is, the cathode ray beam is wobbled or oscillated vertically while it is horizontally scanning a raster on the screen of the picture tube. In this case each horizontal line of the picture is widened and a flat or white field is obtained. The high frequency vertical deflection effectively enlarges the vertical dimension of the electron beam spot without increasing the horizontal dimension.

In prior wobble deflection systems, circuits for oscillating the electron beam of the picture tube utilized auxiliary deflection yokes or coils which are placed around the neck of the picture tube and which form part of the resonant tank of the oscillatory circuit. An auxiliary coil arrangement has a low Q which necessitates a high driving power and increases the amplitude of harmonics which may produce interference in the receiver. Another disadvantage is that it is difficult to resonate auxiliary deflection coils at frequencies above 10 mc. and the wobble pattern is noticeable at lower frequencies. Additionally, the auxiliary coil introduces a production problem and difficulties may be experienced from voltage breakdown between the auxiliary coils and a conventional deflection yoke. Also, if a free running oscillator is utilized in the oscillatory circuit it may emphasize the wobble pattern and any heterodyne beats because the oscillator may drift causing these patterns to move through the picture.

The present invention overcomes the above disadvantages by means of a wobble deflection system using an oscillator in conjunction with electrostatic deflection elements obtained by dividing one of the elements of the picture tube electron gun. In one embodiment an output voltage from the wobble oscillator is applied between the divided or split grid deflection elements by means of A. C. coupling while a D. C. bias is applied to both divided elements for focus purposes. In an illustrated embodiment the wobble deflection system uses a damper controlled oscillator. The damper has horizontal retrace pulses applied to it to synchronize the oscillator with the horizontal sweep circuit. However, it is understood that the invention may be practiced without the use of the damper to control the oscillator.

It is, therefore, an object of the present invention to provide an improved wobble deflection system for use with a television picture tube.

A further object of this invention is to provide a wobble deflection system having a high Q which minimizes the driving power and reduces oscillator harmonics.

A further object of this invention is to provide a wobble deflection system wherein a desired high frequency deflection wave can be easily obtained.

A further object of the invention is to provide a wobble deflection system whose phase is maintained the same at the beginning of each horizontal line of the reproduced picture.

A still further object of this invention is to provide a wobble deflection system having an output in synchronism with the horizontal deflection circuit of a television receiver.

These and other objects are effected by my invention as will be apparent from the following description taken in accordance with the accompanying drawings, throughout which like reference characters indicate like parts, and in which:

Figure 1 is a block diagram of a television receiver system in which the invention is applicable; and Fig. 2 is a schematic diagram of a wobble deflection system used in conjunction with the invention.

In referring to Fig. 1, there is illustrated a television receiver wherein incoming composite television signals, including carrier modulated video and audio signals, are intercepted by an antenna 10 and applied to radio frequency amplifier 11 wherein signals of predetermined frequencies are selected and amplified. The desired signals are converted into carrier waves of intermediate frequency by converter 12 which heterodynes the incoming waves with waves produced by local oscillator 13. The intermediate frequency waves are applied to intermediate amplifier 14 wherein the signals are further selected and amplified. Video signals are derived from the video modulated carrier wave by second detector 15 which also functions to heterodyne the intermediate frequency video modulated carrier and the intermediate frequency audio carrier wave to provide an audio modulated carrier wave of relatively low frequency. In standard television systems the resulting audio modulated carrier wave will have a center frequency of 4.5 mc. The video and audio signals are thereafter applied to video amplifier 16 wherein these signals are amplified and separated. The video signals are applied to the image reproducing device 17 and synchronization signal separator 18, and the audio modulated carrier wave is applied to the sound discriminator and amplifier 19. The frequency modulated audio signals are converted to amplitude modulated signals in the sound signal discriminator and amplifier 19 and after amplification are applied to sound reproducing unit 20.

The synchronization signal separator 18 removes the horizontal and vertical synchronization signals from the composite video signal and amplifies and separates these signals. The vertical synchronization signals are applied to the vertical deflection circuit 21 which generates the necessary deflection signal for the vertical deflection winding of the deflection yoke 22 associated with the image reproducing device 17. Correspondingly the horizontal synchronization signals from the synchronization signal separator 18 are applied to the horizontal deflection circuit 23 which, in turn, excites the horizontal deflection winding of the deflection yoke 22 with an appropriate deflection signal. The arrangement of the receiver thus far described is representative of typical television receiving systems and a more detailed description of its operation is not deemed necessary for clear comprehension of the applicant's invention.

The picture tube 17 includes an assemblage of electrodes known as an electron gun such as that diagramed in Fig. 1. The electron gun produces and focuses a beam of electrons which is deflected by means of the deflection yoke 22 to scan a raster at the target electrode 24 of picture tube. The electron gun comprises a cathode-electrode 25, a control electrode 26, a screen electrode 27, a first anode 28, a focus electrode 29, and a second anode 30. The focus electrode 29 is divided into two parts, which are electrically insulated from each other, to form two semicylindrical electrodes **29*a* and 29*b*. The electrode 29 is used to establish the electrostatic field to focus the electron beam of the picture tube. In addition, when a voltage difference is applied to the electrodes 29*a* and 29*b***, the electron beam may be vertically deflected in addition to the usual horizontal and vertical deflections utilized when employing a conventional scan.

The video signals are applied to the control electrode 26 and are used to modulate the electron beam of the picture tube 17. A suitable voltage source 31 is provided for supplying focusing voltage for the energization of the focusing electrode 29. The voltage source 31 may be the same voltage source which furnishes a potential for anode power for the receiving tubes in the receiver. Focus electrode 29 performs as a single piece grid for beam focusing purposes and as a multi-piece grid for beam deflection purposes.

From an appropriate section of the horizontal deflection circuit 23 there is derived a series of pulses which are applied to a damping means 33. The output of the damping means is applied to the oscillator 32 whose output is, in turn, applied to the focusing electrode 29 along with the direct current focusing voltage from the focus voltage source 31.

Referring now more particularly to the circuit including the oscillator 32 and the damping means 33, reference is made to Fig. 2 in which the oscillator 32 includes an electron tube 34 comprising a plate electrode 36, a control grid 37 and a cathode 38; a resonant tank circuit 39 comprising an inductance 40 and a condenser 41; a feedback coupling condenser 42 and a grid return resistor 43. One end of the tank circuit 39 is connected to ground potential while the other end is connected to coupling condenser 42. A tap 44 on the tank inductor 40 is connected to the cathode 38 of oscillator tube 34. The plate 36 of tube 34 is connected to a suitable voltage source B+ and through capacitor 45 to ground potential.

One side **29*b* of the divided focus electrode 29 is coupled to the grounded end of the oscillator tank 39 by means of condenser 46, while the other side 29*a* of the focus electrode 29 is coupled to the ungrounded end of the oscillator tank 39 by condenser 47. Resistor 48 provides a direct current path for the direct current focussing potential which is applied to the focus electrode 29**.

The damper 33 is illustrated as an electron tube 50 having a plate electrode 51, a control grid 52 and a cathode 53. The control grid 52 is returned to the cathode 53 by means of a grid resistor 54. The plate 51 and cathode 53 of the damper tube 50 are connected across the tank circuit 39, cathode 53 being connected to the grounded end while the plate 51 is connected to the ungrounded end.

The oscillator shown in Fig. 2 is a Hartley oscillator. It should be understood that other types of oscillators such as the Colpitts oscillator may also be used in the practice of my invention.

Referring now to the operation of the circuit of Fig. 2, it is seen that the output of the oscillator 32 is applied across the divided focusing electrode 29 of the picture tube. The damper tube 50 is connected across the tank circuit 39 of the tube 34 and acts to damp out the oscillations during horizontal retrace time. The damper tube 50 causes the oscillator to start in phase at the beginning of each horizontal line of the reproduced picture. The damper tube 50 is caused to conduct by the application of a positive pulse to its control grid 52 through a coupling capacitor 55. This positive retrace pulse may be obtained conveniently from an extra winding on the horizontal output transformer which is part of the horizontal deflection circuit 23 of Fig. 1. The damper tube 50 is responsive to the horizontal retrace pulses applied to its control grid 52 and the plate current of the damper tube 50 which is drawn from the oscillator tank 39 causes the output of the oscillator to be in synchronism with the horizontal retrace pulses.

The circuit shown in Fig. 2 may be simplified if the resulting economy justifies the decrease in performance. In a more economical embodiment, the damper tube 50, resistor 54 and condenser 55 may be eliminated. The remainder of the circuit consisting of the oscillator 32, split focussing grid 29 and associated components 46, 47 and 48 operates to reduce the line structure although the oscillator is free running and not phase controlled. Although damper control of the phase is desirable it is not as necessary with a high Q split grid wobbler system as with a low Q auxiliary coil wobbler because less harmonic interference is produced by the high Q split grid structure.

Although the invention has been described with reference to certain specific embodiments thereof, numerous modifications falling within the spirit and scope of the invention will be readily apparent to those skilled in this art, after the benefit of the above teachings has been obtained. For example, instead of applying the oscillatory deflection voltage to a divided focus electrode, any other divided grid of the electron gun may be split in two or more equal or unequal parts to provide one or more sets of auxiliary deflection electrons. Also, if an electromagnetic wobble deflection system is used it is considerably improved by using the controlled oscillator to generate the vertical deflection wave applied to an auxiliary coil located around the neck of the picture tube. The damper controlled oscillator will prevent an intereference pattern from moving through the picture.

I claim as my invention:

1. A cathode ray tube spot wobble deflection system comprising, a cathode ray tube comprising a target electrode and an electron gun arrangement for producing and focusing a beam of electrons, said electron gun arrangement including as a part thereof a divided electrode, main deflection means for said cathode ray tube, a vertical deflection circuit connected to said main deflection means for deflecting said beam in a vertical direction across said target electrode at a relatively slow rate, a horizontal deflection circuit connected to said main deflection means for deflecting said beam in a horizontal direction across said target electrode at a more rapid rate, and an auxiliary vertical deflection circuit connected to said divided electrode for effecting a very rapid deflection of said beam in a vertical direction.

2. A cathode ray tube spot wobble deflection system comprising, a cathode ray tube comprising a target electrode and an electron gun arrangement for producing and focusing a beam of electrons, said electron gun arrangement including as a part thereof a divided electrode, main deflection means for said cathode ray tube, a vertical deflection circuit connected to said main deflection means for deflecting said beam in a vertical direction across said target electrode at a relatively slow rate, a horizontal deflection circuit connected to said main deflection means for deflecting said beam in a horizontal direction across said target electrode at a more rapid rate, and an auxiliary vertical deflection circuit including means for maintaining it in synchronism with said horizontal deflection circuit connected to said divided electrode for effecting a very rapid deflection of said beam in a vertical direction.

3. A cathode ray tube spot wobble deflection system comprising, a cathode ray tube comprising a target electrode and an electron gun arrangement for producing and focusing a beam of electrons, main deflection means for said cathode ray tube, a vertical deflection circuit connected to said main deflection means for deflecting said beam in a vertical direction across said target electrode at a relatively slow rate, a horizontal deflection circuit connected to said main deflection means for deflecting said beam in a horizontal direction across said target electrode at a more rapid rate, an auxiliary vertical deflection means for said cathode ray tube, and an auxiliary vertical deflection circuit connected to said horizontal deflection circuit for applying horizontal retrace pulses from said horizontal deflection circuit thereto to maintain said auxiliary vertical deflection circuit in synchronism with said horizontal retrace pulses, said auxiliary vertical deflection circuit being connected to said auxiliary vertical deflection means for effecting a very rapid deflection of said beam in a vertical direction.

4. A cathode ray tube spot wobble deflection system comprising, a cathode ray tube comprising a target electrode and an electron gun arrangement for producing and focusing a beam of electrons, main deflection means for said cathode ray tube, a vertical deflection circuit connected to said main deflection means for deflecting said beam in a vertical direction across said target electrode at a relatively slow rate, a horizontal deflection circuit connected to said main deflection means for deflecting said beam in a horizontal direction across said target electrode at a more rapid rate, an auxiliary vertical deflection means for said cathode ray tube, and an auxiliary vertical deflection circuit connected to said auxiliary vertical deflection means for effecting a very rapid deflection of said beam in a vertical direction in synchronism with said horizontal deflection circuit, said auxiliary vertical deflection circuit comprising an oscillator and damping means for said oscillator connected to said horizontal deflection circuit.

5. A cathode ray tube spot wobble deflection system comprising, a cathode ray tube comprising a target electrode on an electron gun arrangement for producing and focusing a beam of electrons, said electron gun arrangement including as a part thereof a divided focusing electrode, main deflection means for said cathode ray tube, a vertical deflection circuit connected to said main deflection means for deflecting said beam in a vertical direction across said target electrode at a relatively slow rate, a horizontal deflection circuit connected to said main deflection means for deflecting said beam in a horizontal direction across said target electrode at a more rapid rate, and an auxiliary vertical deflection circuit connected to said divided focusing electrode for effecting a very rapid deflection of said beam in a vertical direction in synchronism with said horizontal deflection circuit, said auxiliary vertical deflection circuit comprising an oscillator and damping means for said oscillator connected to said horizontal deflection circuit.

6. A cathode ray tube spot wobble deflection comprising: a cathode ray tube comprising a target electrode and an electron gun arrangement for producing and focusing a beam of electrons, said electron gun arrangement including as a part thereof a divided electrode; main deflection means for said cathode ray tube; a vertical deflection circuit connected to said main deflection means for deflecting said beam in a vertical direction across said target electrode at a relatively slow rate; a horizontal deflection circuit connected to said main deflection means for deflecting said beam in a horizontal direction across said target electrode at a more rapid rate; and an auxiliary vertical deflection circuit for effecting a very rapid deflection of said beam in a vertical direction comprising, an oscillator having an output connected to said divided electrode and control means for said oscillator, a source of horizontal retrace pulses, means to apply said horizontal retrace pulses to said control means, said control means being responsive to said horizontal retrace pulses to produce a control voltage, and means to apply said control voltage to said oscillator to cause said output of said oscillator to be in synchronism with said horizontal retrace pulses.

7. A cathode ray tube spot wobble deflection system comprising: a cathode ray tube comprising a target electrode and an electron gun arrangement for producing and focusing a beam of electrons; main deflection means for said cathode ray tube; a vertical deflection circuit connected to said main deflection means for deflecting said beam in a vertical direction across said target electrode at a relatively slow rate; a horizontal deflection circuit connected to said main deflection means for deflecting said beam in a horizontal direction across said target electrode at a more rapid rate; an auxiliary vertical deflection means for said cathode ray tube; and an auxiliary vertical deflection circuit for effecting a very rapid deflection of said beam in a vertical direction comprising, an oscillator having an output connected to said auxiliary vertical deflection means and control means for said oscillator, a source of horizontal retrace pulses, means to apply said horizontal retrace pulses to said control means, said control means being responsive to said horizontal retrace pulses to produce a control voltage, and means to apply said control voltage to said oscillator to cause said output of said oscillator to be in synchronism with said horizontal retrace pulses.

References Cited in the file of this patent

UNITED STATES PATENTS 2,093,157 Nakashima ____________ Sept. 14, 1937